United States Patent [19]

Jensen

[11] Patent Number: 5,429,167
[45] Date of Patent: Jul. 4, 1995

[54] UNIVERSAL CENTRAL TIRE INFLATION SYSTEM FOR TRAILERS

[75] Inventor: Douglas Jensen, Berlin, Wis.

[73] Assignee: Oshkosh Truck Corporation, Oshkosh, Wis.

[21] Appl. No.: 106,014

[22] Filed: Aug. 13, 1993

[51] Int. Cl.⁶ ............................................. B60C 23/00
[52] U.S. Cl. .................................. 152/417; 152/415; 277/152
[58] Field of Search ................... 152/415, 416, 417; 277/152

[56] References Cited

U.S. PATENT DOCUMENTS

| | | | |
|---|---|---|---|
| 2,149,797 | 3/1939 | Starke | 152/416 |
| 2,577,458 | 12/1951 | Gaiptman | 152/416 |
| 2,634,782 | 4/1953 | Turek et al. | 152/417 |
| 2,693,841 | 11/1954 | Webster | 152/416 |
| 2,976,906 | 3/1961 | Kamm et al. | 152/417 |
| 2,989,999 | 6/1961 | Holbrook et al. | 152/416 |
| 3,099,309 | 7/1963 | Horta et al. | 152/417 |
| 3,362,452 | 1/1968 | Harnish | 152/416 |
| 3,705,614 | 12/1972 | Juttner et al. | 152/417 |
| 4,387,931 | 6/1983 | Bland | 152/416 X |
| 4,418,737 | 12/1983 | Goodell et al. | 152/416 |
| 4,431,043 | 2/1984 | Goodell et al. | 152/417 |
| 4,434,833 | 3/1984 | Swanson et al. | 152/417 |
| 4,470,506 | 9/1984 | Goodell et al. | 206/223 |
| 4,492,019 | 1/1985 | Wells et al. | 29/447 |
| 4,582,107 | 4/1986 | Scully | 152/417 |
| 4,641,698 | 2/1987 | Bitonti | 152/416 |
| 4,709,738 | 12/1987 | Goodell et al. | 152/400 |
| 4,730,656 | 3/1988 | Goodell et al. | 152/417 |
| 4,765,385 | 8/1988 | McGeachy | 152/416 |
| 4,804,027 | 2/1989 | Runels | 152/417 |
| 4,844,138 | 7/1989 | Kokubu | 152/417 |
| 4,883,106 | 11/1989 | Schultz et al. | 152/417 |
| 4,892,128 | 1/1990 | Bartos | 152/417 |
| 4,932,451 | 1/1990 | Williams et al. | 152/417 |
| 5,080,156 | 1/1992 | Bartos | 152/417 |

Primary Examiner—Michael W. Ball
Assistant Examiner—Francis J. Lorin
Attorney, Agent, or Firm—Baker & McKenzie

[57] ABSTRACT

A central tire inflation system for vehicles including but not limited to trailers of tractor-trailer rigs is provided. The system requires no modification to the wheel hubs or axle tubes and therefore may be incorporated as original equipment or in the form of retrofit kits. Communication is provided between a pressurized air reservoir through the axle tubes and through a spindle sleeve disposed on the end of each tube into a sealed chamber. The chamber is defined by the spindle hub, hub cover, rotary seal and spindle sleeve or seal carrier attached to a spindle nut. The seal carrier encloses the end of the axle. At least one air passageway is provided in the spindle hub which provides communication to the wheel valves. The control system includes a plurality of multi-port two-way pneumatic valves.

18 Claims, 6 Drawing Sheets

UNIVERSAL CENTRAL TIRE INFLATION SYSTEM FOR TRAILERS

FIELD OF THE INVENTION

This invention relates generally to central tire inflation systems. The central tire inflation system of the present invention may be provided as original equipment or in the form of a retrofit kit. Communication is provided between a compressed air reservoir, via an axle tube, through a seal carrier and spindle hub and into the tire. No modification of the axle tube or hub is required to accommodate the central tire inflation system of the present invention.

BACKGROUND OF THE INVENTION

The concept of a central tire inflation system (CTIS) for vehicles is well-known. A central tire inflation system allows the operator to control the air pressure of the tires for improved performance of the tires and of the vehicle. However, the central tire inflation systems currently available suffer from two primary drawbacks. First, the axle and hub and possibly other parts must be extensively modified in order to accommodate a conventional system. Second, no separate central tire inflation systems are currently available for trailers of tractor-trailer rigs. The present invention satisfies this long-felt need by providing a central tire inflation system and further is designed to be applicable to both trailers as well as other vehicles and further that requires no modification to existing axle tubes or hubs.

Central tire inflation systems in general are an important feature. Specifically, an off-road vehicle will often drive on soft, muddy surfaces and then switch to harder surfaces, such as paved roads. To obtain proper traction on soft, muddy surfaces, the tire should be operated at a relatively low pressure. To obtain proper traction and optimal fuel mileage on harder surfaces, the tires should be operated at relatively high pressures.

The differences between preferred high tire pressures (hard surfaces) and preferred low tire pressures (soft surfaces) may be quite large. For example, some truck tire manufacturers recommend a maximum tire pressure of 120 psi for highway conditions and 8 to 15 psi for extremely soft conditions such as sand, mud and swamps. A tire pressure for intermediate road conditions may be approximately 40 psi. Of course, in the case of trailers, the preferred tire pressure will also be dependent upon the weight of the goods or equipment carried in the trailer.

Another reason justifying the employment of central tire inflation systems is road surface deterioration. It is known that over-inflated tires are a major cause of road surface deterioration. Road repair and road building have become increasingly expensive and it is therefore foreseeable that governmental entities may begin penalizing the operators of trucks and tractor-trailers for operating equipment on public roads with improperly inflated tires or over-inflated tires.

Of course, another reason justifying central tire inflation systems is fuel economy. Soft tires on highways reduce gas or fuel mileage. A central tire inflation system that automatically controls the air pressures of trailer tires on a highway will increase fuel efficiency as well as improve road surface longevity.

As noted above, central tire inflation systems in general are well-known and kits for retrofitting existing equipment to accommodate central tire inflation systems are also known. However, the presently available systems and kits require extensive design changes and/or modifications to existing equipment in order to accommodate the systems. This problem could be overcome by providing a central tire inflation system that would simply screw on to or otherwise readily attach onto the ends of axles and readily attach onto the hubs.

BRIEF DESCRIPTION OF THE INVENTION

The present invention satisfies the aforenoted needs and further makes a significant contribution to the central tire inflation system art by providing an improved central tire inflation system that may be employed on trailers, tractor-trailer rigs as well as other vehicles. The system of the present invention may be installed without modification to existing axle tube ends or hubs. Further, the system provided by the present invention may be installed as original equipment without significantly increasing the cost of the vehicle or trailer.

The improved central tire inflation system of the present invention includes an air reservoir that is mounted either on the tractor or on the trailer. Communication is established between the air reservoir and the existing axle tubes. A seal carrier is mounted on the end of each axle tube. Because axle tubes normally have threaded ends, the preferred seal carrier is threaded to screw on to the end of an axle tube. The seal carrier includes an air line, conduit or an air passageway that provides communication between the axle tube and a chamber, which is discussed below.

The seal carrier carries at least one seal means, preferably in the form of a rotary seal or TEFLON ® tip seal. An outer housing is mounted around the seal and is connected to the hub.

In one preferred embodiment, the seal carrier is attached to the end of a spindle sleeve, or spindle nut and an outer housing is provided in the form of a spindle hub. The wheel valve is mounted to the exterior surface of the spindle hub. The spindle hub is connected to the hub. No wheel valve is mounted on the rim. The spindle hub includes two air passageways, one leading into the wheel valve and one leading out of the wheel valve and towards the tire.

In a second embodiment, the seal carrier is also provided in the form of a spindle sleeve and the outer housing is provided in the form of a spindle hub, but with a hub cover attached to the outer surface thereof. The wheel valve is mounted on the rim. The spindle hub is bolted or otherwise attached to the hub. The spindle hub includes one air passageway that eventually leads to the wheel valve and then into the inside of the tire.

The aforenoted chamber of both embodiments is bound by the outer surface of the seal carrier or spindle sleeve, the outer surface of the seal means or rotary seal, and the inner surfaces of the spindle hub or hub cover.

A first communication means is herein defined as a communication from the air reservoir, via the axle tube and through the seal carrier into the chamber. A second communication means is defined as the air passageway disposed in the outer housing or the spindle hub which establishes communication between the chamber and the wheel valve. The spindle hub may also accommodate part of a third communication means between the wheel valve and the tire.

The present invention also lends itself to an improved method of retrofitting vehicles to accommodate central tire inflation systems. Specifically, communication is established between the air tank mounted on the vehicle and the axle tube via conventional means such as hoses and couplings. With the pre-existing spindle and housing removed, the seal carrier in the form of a spindle sleeve or a seal carrier attached to a spindle sleeve is screwed on to the end of the axle tube. The seal means or rotary seal is mounted on to the outer periphery of the seal carrier. The outer housing in the form of a spindle hub is mounted on to the rotary seal and is bolted to the hub. A hub cover is mounted on to and bolted to the outer edge of the spindle hub.

In the preferred embodiment, communication is established between the axle tube and the tire by two passageways disposed in the spindle hub. The wheel valve is mounted to the end of the spindle hub and is disposed between the two passageways. In an alternative embodiment, communication is established between the air passageway disposed in the spindle hub and the tire with conventional means such as hosing which leads to a wheel valve mounted on the rim or wheel and which is connected to a port disposed on the tire.

The retrofitting kit provided by the present invention will include hoses and other coupling means for connecting the air tanks to the axle tubes. The main components of the system will include the spindle sleeve or seal carrier and the spindle hub. A rotary seal will be provided for mounting on to the outer periphery of the seal carrier and will accommodate the outer housing which is preferably in the form of a spindle hub and hub cover. Bolts will be provided to mount the spindle hub on to the hub. Air lines in the form of hoses and couplings will be provided from the spindle hub to a wheel valve and to a port disposed on the tire. A separate CTI reservoir tank and a separate accumulator tank may be required for some embodiments. The required valves and connections are shown in the figures.

Thus, the present invention provides an improved and simplified central tire inflation system for retrofitting existing vehicles. The system requires no substantial modifications to existing vehicles and may also be supplied as original equipment without substantially increasing the cost of the vehicles.

It is therefore an object of the present invention to provide a central tire inflation system for all vehicles including trailers of tractor-trailer rigs.

Another object of the present invention is to provide retrofitting kits for retrofitting existing vehicles to accommodate central tire inflation systems.

Yet another object of the present invention is to provide an improved method for retrofitting existing vehicles to accommodate central tire inflation systems.

Other objects and advantages of the present invention will become apparent upon reading the following detailed description and appended claims, and upon reference to the accompanying drawings.

BRIEF DESCRIPTION OF THE DRAWINGS

This invention is illustrated more or less diagrammatically in the accompanying drawing, wherein.

DETAILED DESCRIPTION OF THE INVENTION

Like reference numerals will be used to refer to like or similar parts from Figure to Figure in the following description of the drawings.

The dramatic improvement contributed by the present invention is best understood after consideration of how conventional central tire inflation systems are designed. First, conventional central tire inflation systems are designed so that they are an integral part of the axle housing or the spindle or the wheel hub. Therefore, the entire wheel-end assembly of the vehicles must be redesigned to incorporate systems taught by the prior art. This redesigning process can add substantially to the cost of the vehicle. In retrofitting existing vehicles with a central tire inflation system, the prior art discloses only designs that require extensive and custom modifications to the wheel-ends. Further, many kits known in the prior art require new wheels, hubs, and further require that the axles be modified. The present invention provides an effective, simplified and less expensive solution to the above problems because no design changes are required for the axle end or the hub. Further, existing spindle sleeves and spindle hubs may be easily modified to accommodate the present invention or, further, new spindle sleeves and spindle hubs may be provided without substantial cost.

Figure 1:
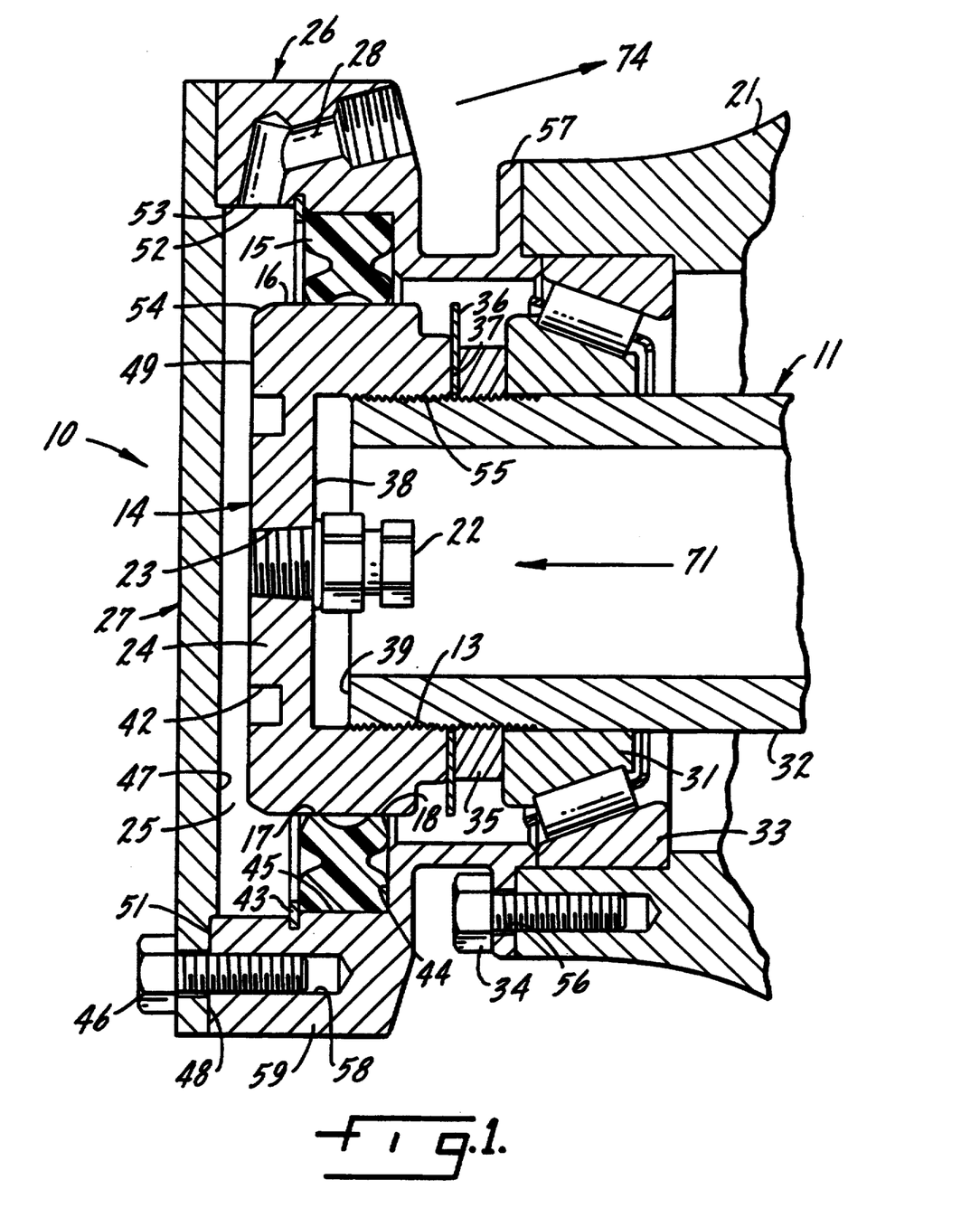
FIG. 1 is a side cross-sectional view of a seal carrier and outer housing of a central tire inflation system made in accordance with the present invention as mounted on a left wheel-end assembly.

As seen in FIG. 1, a left wheel-assembly 10 is illustrated which incorporates the basic features of the central tire inflation system of the present invention. Specifically, a hollow axle tube 11 is in fluid communication with the air tanks or air reservoir 12 (see FIG. 5) which is mounted on either the vehicle, trailer or tractor (not shown). Threads, indicated at 13, are provided at the end of the axle tube 11, which is a depiction of conventional axle tubes provided on trailers of tractor-trailer rigs. Hence, the axle tube 11 shown in FIG. 1 has not been modified to incorporate the central tire inflation system of the present invention.

A seal carrier 14 is threadably connected to the end of the axle tube 11. The seal carrier or spindle sleeve 14 carries the seal means 15 on the outer periphery 16 of the spindle sleeve 14. The sealing faces shown at 17 and 18 engage the outer periphery 16 of the spindle sleeve 14 and substantially prevent the leakage of air in the inboard direction or toward the hub 21 and axle tube 11.

It will be noted that the axle tube 11 is preferably hollow so as to provide communication between the air reservoir 12 (see FIG. 5) and the air line 22. The air line 22 includes the conduit 23 which extends through the front wall 24 of the spindle sleeve 14. Thus, the air line 22 and conduit 23 provide communication between the axle tube 11 and the chamber, shown generally at 25.

Figure 5:
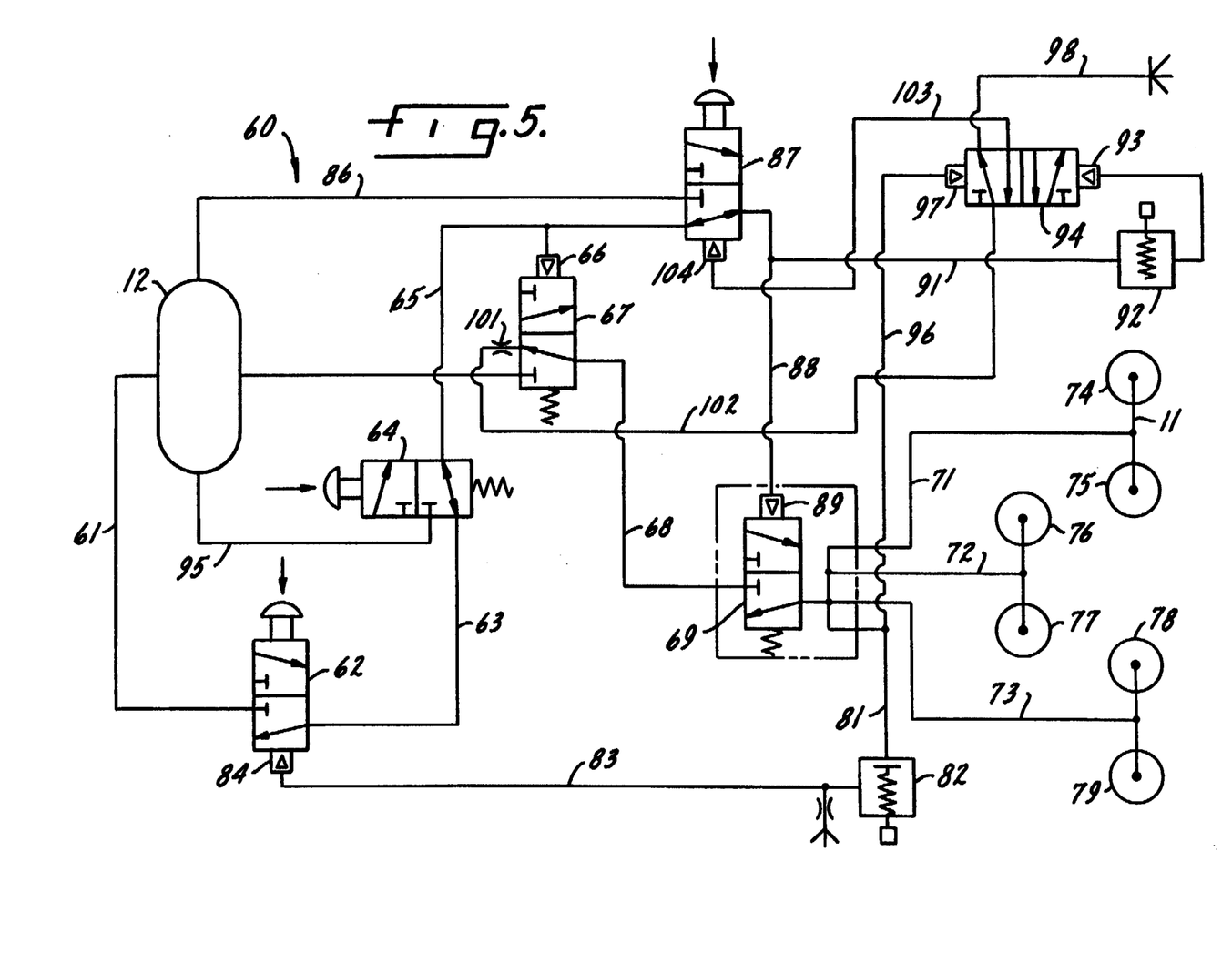
FIG. 5 is a schematic diagram of the air flow and pressure control of a central tire inflation system shown in FIGS. 1 through 4.

The chamber 25 is bound by the rotary seal 15, the spindle sleeve 14, the spindle hub 26 and the hub cover 27. Communication is established between the chamber 25 and the tire by the air passageway 28 which leads to a wheel valve 74 (see FIG. 5) which is connected to an air line which is connected to a tire (not shown). The wheel valve 74 is one of six wheel valves indicated in FIG. 5. Air is supplied to the axle tube 11 from a conduit 71 which is connected to a valve 69 as seen in FIG. 5 and explained below.

Thus, a standard axle tube 11 and standard wheel hub 21 will accommodate the central tire inflation system of the present invention without modification thereof. The axle tube 11 supports the hub 21 with the bearing cone indicated at 31. The bearing cone 31 is carried by the outer periphery 32 of the axle tube 11 and engages the bearing cup 33 which is carried by the hub 21. The spindle hub 26 is mounted to the hub 21 via a plurality of bolts, one of which is shown at 34. Of course, other means for attaching the spindle hub 26 (or outer housing) to the hub 21 are available and will be apparent to those skilled in the art.

The position of the bearing cup 31 is maintained by the inner nut 35 and locking tab washer 36. The locking tab washer 36 is engaged by the inner face 37 (see also FIG. 3) of the spindle sleeve 14. In the embodiment shown in FIG. 1, it will be noted that the inner wall 38 of the spindle sleeve 14 does not engage the distal end 39 of the axle tube 11. However, an alternative design would be to alter the sizing of the spindle sleeve 14 so that the inner wall 38 abuttingly engages the distal end 39 of the axle tube 11. The spindle sleeve 14 is easily screwed on to the axle tube 11 with an internal hex nut 42 (see also FIG. 2) which engages a wrench (not shown).

The rotary seal 15 is held in place with the retaining ring 43. The seal 15 engages the spindle hub 26 at two places, the outwardly facing wall 44 and the inwardly facing wall 45. The hub cover 27 is mounted on to the spindle hub 26 via a plurality of bolts, one of which is shown at 46. In the preferred embodiment shown in FIG. 1, the outer periphery of the inner wall 47 of the hub cover 27 includes a slot 48 which engages the outer face 51 of the spindle hub 26. Additional lubricants or a gasket may be provided to ensure a seal between the outer face 48 and slot 51. The opening 52 which is the entrance to the passageway 28 is disposed in the inner wall 53 of the spindle hub 26. Thus, the chamber 25 is bound by the inner wall 53 of the spindle hub 26, the inner wall 47 of the hub cover 27, the rotary seal 15 is held in place by the retaining ring 43, the outer periphery 16 of the spindle sleeve 14 and the outer surface 49 of the front wall 24 of the spindle sleeve 14.

Figures 2, 3:
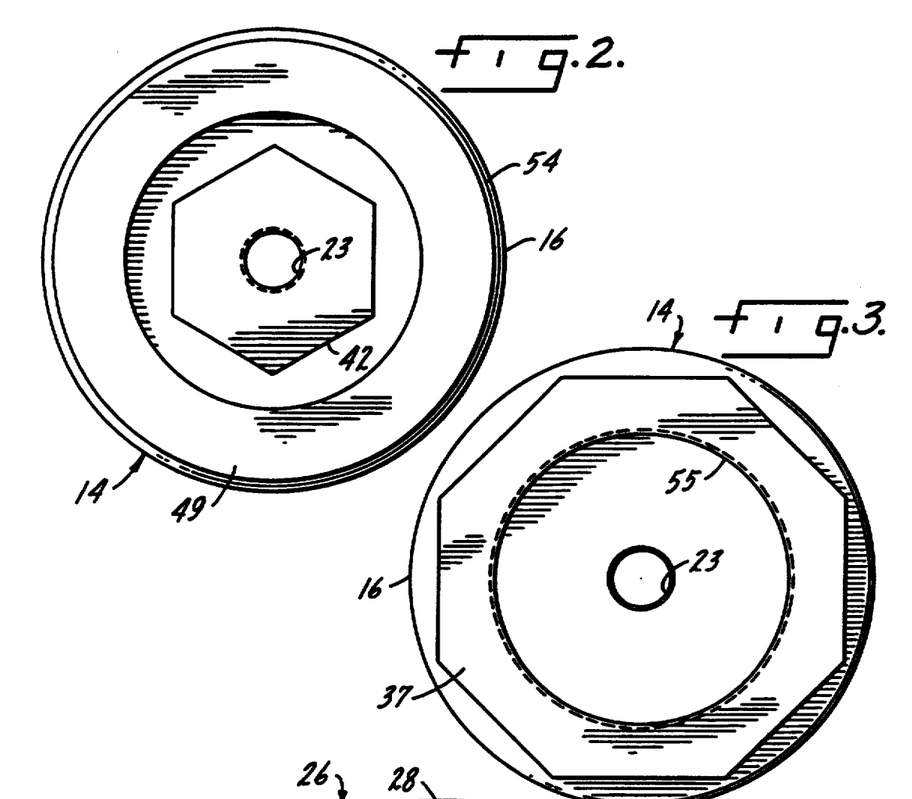
FIG. 2 is a front elevational view of the seal carrier shown in FIG. 1.
FIG. 3 is a rear elevational view of the seal carrier shown in FIG. 1.

Turning to FIG. 2, a front elevational view of the seal carrier or spindle sleeve 14 is illustrated. The beveled edge 54 is provided in the preferred embodiment to facilitate the installation of the rotary seal 15 and to limit any damage to the seal 15 when it is forced over the outer periphery 16 of the spindle sleeve 14. The internal hex nut 42 provides an easy installation of the spindle sleeve 14 on to the threads 13 of the axle tube 11.

The tapered conduit 23 provides communication between the chamber 25 and the inside of the axle tube 11 (see FIG. 1).

Figure 4:
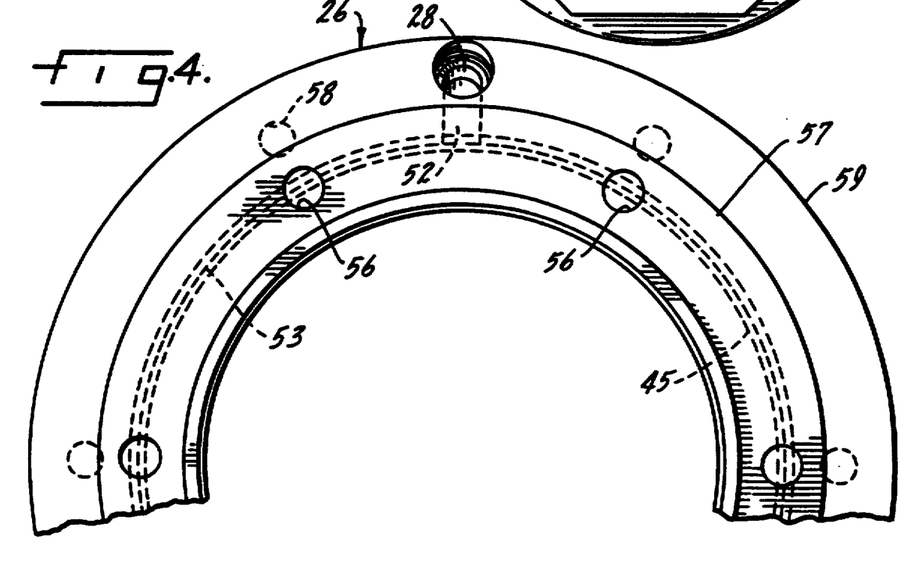
FIG. 4 is a partial rear elevational view of the spindle hub portion of the outer housing shown in FIG. 1.

Turning to FIG. 3, and threads 55 engage the threads 13 disposed on the outer periphery 32 of the axle tube 11. FIG. 4 is an illustration of the means for connecting the spindle hub 26 to the hub 21 (see FIG. 1). A plurality of studs and nuts 34 (see FIG. 1) extend through the holes 56 disposed in the wall 57 of the spindle hub 26. A plurality of bolts 46 (see FIG. 1) extend through the holes shown in phantom at 58 (see also FIG. 1) disposed in the outer face 51 (see FIG. 1) of the outer periphery 59 of the spindle hub 26.

Turning to FIG. 5, the control of the air flow and air pressure of the central tire inflation system 60 of the present invention is illustrated. The system 60 is in communication with the reservoir 12 which may be mounted on the trailer or tractor or the vehicle. The tires, not shown, are inflated as follows. Air pressure from the reservoir 12 is supplied through the conduit 61 to the three-port, two-way, button-operated, pilot-return pneumatic valve 62. When the valve 62 is activated, it allows air to proceed through the conduit 61 to the conduit 63 and into the pneumatic valve 64. When the valves 64 and 87 are activated, air passes through the valve 64 and through conduit 65 and into the control port 66 of the pneumatic valve 67 thereby activating valve 67. Air also passes through the activated valve 87 and into the control port 89 of the pneumatic valve 69 thereby activating valve 69. Air passes from the reservoir 12 through the valve 67 through the conduit 68 and into the now-activated pneumatic valve 69. Air then passes through the pneumatic valve 69 and through the conduits 71, 72, 73 and through the tire valves indicated at 74–79.

When the preset tire pressure is reached, the pressure is sensed through the conduit 81 by the pressure protection valve 82 which is opened and supplies air pressure through the conduit 83 to the pilot port 84 of the pneumatic valve 62 returning the valve 62 to the deactivated position and cutting off the supply of air pressure to the conduit 63, and consequently deactivates valve 69 thereby closing the wheel valves 74–79 to maintain the desired tire pressures. The now-closed valve 62 then exhausts the pilot pressures in the valves 67 and 69 to atmosphere.

The tire deflation process or tire pressure-reduction process is as follows. Air pressure from the reservoir 12 is supplied through the conduit 86 to the pneumatic valve shown at 87. When the valve 87 is activated, air pressure is communicated from the conduit 86 through the valve 87 and through the conduit 88 to the control port 89 of the valve 69. Further, pressure is transmitted through the conduit 91 to the pressure regulator 92 which is attached to the first control port 93 of the pneumatic valve 94.

Momentary hold and release operation of the valve 64 supplies air from the reservoir 12 through the conduit 95 through the valve 64 and through the conduit 65 to the control port 66 of the valve 67. The valve 67 now supplies air pressure from the reservoir 12 through the valve 67 and through the conduit 68 and through the valve 69 and through the conduits 71, 72, 73 to the tire valves 74–79. Each of the conduits 71, 72 and 73 include an axle tube like the one shown at 11 in FIG. 1. This operation opens the tire valves 74–79 allowing air pressure to flow in both directions (i.e., inflate or deflate) and also supplies air pressure through the conduit 96 to the second control port 97 of the valve 94. By supplying air pressure to the second control port 97 of the pneumatic valve 94, the valve 94 is shifted to the exhaust position because the tire pressure as sensed through the conduit 96 and control port 97 is higher than the desired air pressure or the air pressure coming from the reservoir 12 as sensed through the conduit 91 and at the pressure regulator 92 and control port 93. Air is then exhausted through the conduit 98.

When the valve 64 is released, air pressure is no longer supplied through the conduit 65 to the valve 67 which, in turn, no longer supplies air pressure through the conduit 68 for inflation of the tires. However, the valve 67, in turn, directs the air flow (i.e., deflation air) through the orifice 101 and then through the conduit 102 to the valve 94 which exhausts the air pressure through the conduit 98 to the atmosphere. When the deflation air pressure becomes less than the regulator 92 air pressure at the first control port 93 of the valve 94, the valve 94 shifts and redirects the air flow through the conduit 103 to the pilot port 104 of the valve 87. The valve 87 then exhausts the pilot pressure at the control port 89 of the valve 69 which in turn closes the tire valves 74–79 so that the desired pressure is maintained in the tires.

Figures 6, 7, 11:
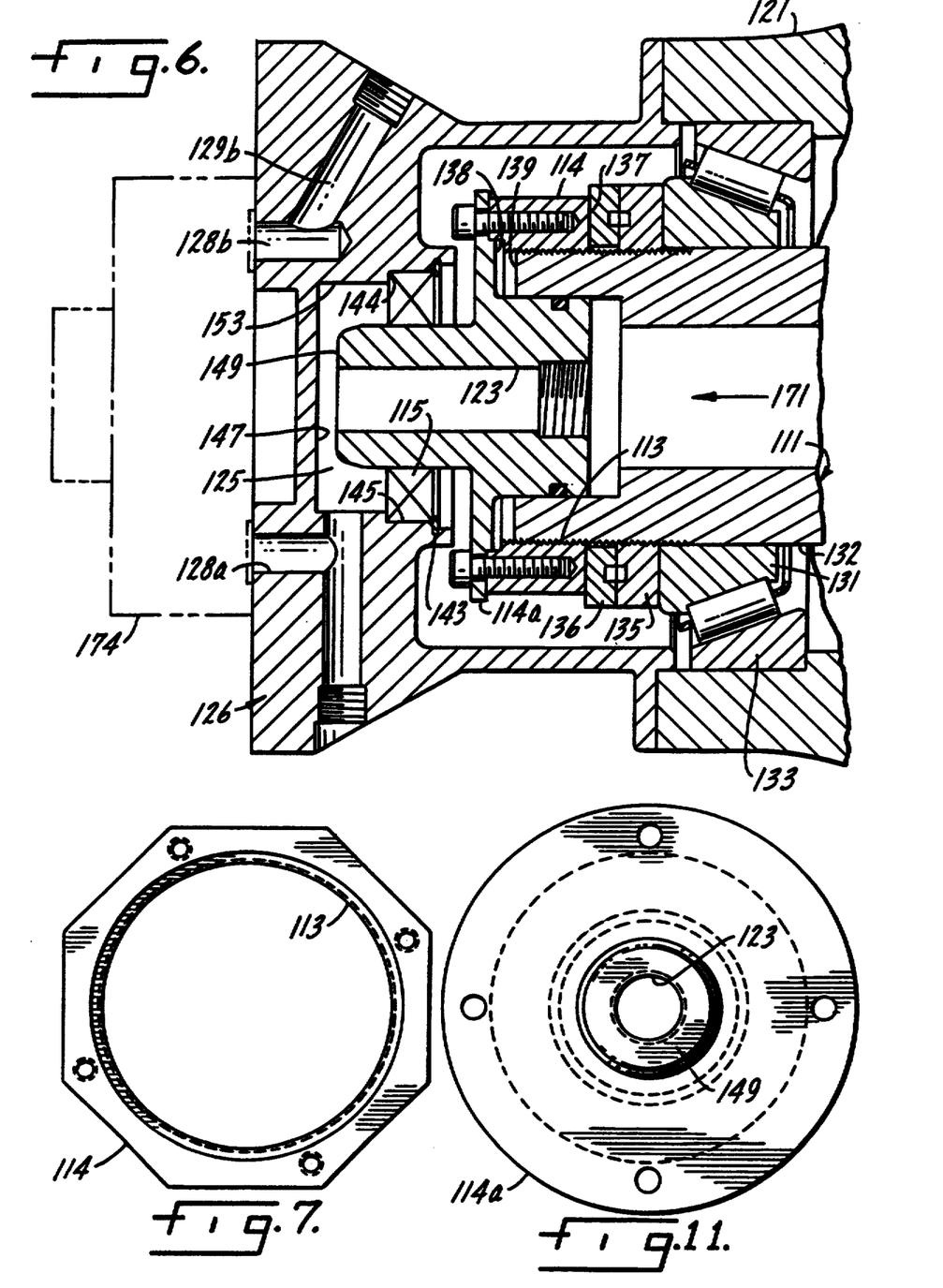
FIG. 6 is a side-cross sectional view of a seal carrier and outer housing of a central tire inflation system made in accordance with the present invention as mounted on a left wheel-end assembly, particularly illustrating the preferred embodiment.
FIG. 7 is a front elevational view of a spindle nut shown in FIG. 6.
FIG. 11 is a front elevational view of the seal spindle shown in FIG. 6.

Turning to FIG. 6, the preferred embodiment of the present invention is illustrated. Elements of FIG. 6 that are analogous to those elements shown in FIG. 1 include the same reference number preceded by a 1 (i.e. axle tube 11 in FIGS. 1–4 is referred to as axle tube 111 in FIGS. 6–9). A spindle nut 114 is attached to the end of an axle tube 111. A seal carrier or seal spindle 114a is bolted onto the end of the spindle nut 114. A seal means 115 is provided and is similar in configuration to the rotary seal 15 shown in FIG. 1. The seal means 115 is held in place by a retainer ring 143 and the two walls 144, 145 disposed in the spindle hub 126. The chamber 125 is bound by the outer end 149 of the seal spindle 114a and the inner walls 147, 153 of the spindle hub 126.

In contrast to the spindle hub 26 shown in FIG. 1, the spindle hub 126 shown in FIG. 6 includes two air passageways 128a, 128b. Air passageway 128a establishes communication between the chamber 125 and the wheel valve 174. The second passageway 128b establishes communication between the wheel valve 174 and the tire (not shown).

FIG. 7 is a front elevational view of the spindle nut 114 shown in FIG. 6. The spindle nut 114 as connected to the seal carrier or seal spindle 114a comprises the analogous element to the spindle sleeve 14 shown in FIG. 1 and described above. FIG. 11 is a front elevational view of the seal carrier or seal spindle 114a.

Figure 8:
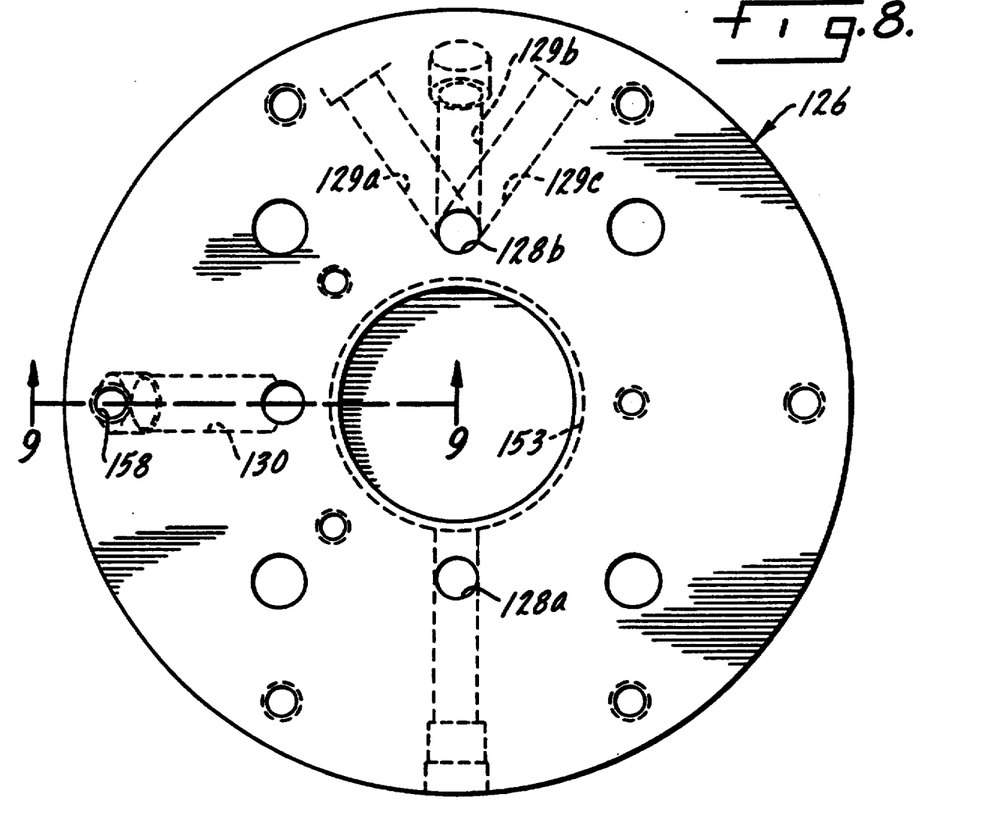
FIG. 8 is a front elevational view of the spindle hub shown in FIG. 6.

The improved spindle hub 126 is shown in FIG. 8. The passageway 128a supplies air to the wheel valve (not shown) and the passageway 128b establishes communication between the wheel valve and the tire. The passageway 128b feeds three ports 129a, 129b, 129c. Two ports supply air to the tire and a third port is connected to a schrader valve (not shown) which enables the operator to add pressure if necessary. Port 130 is a breather valve for the wheel valve 174.

Figure 9:
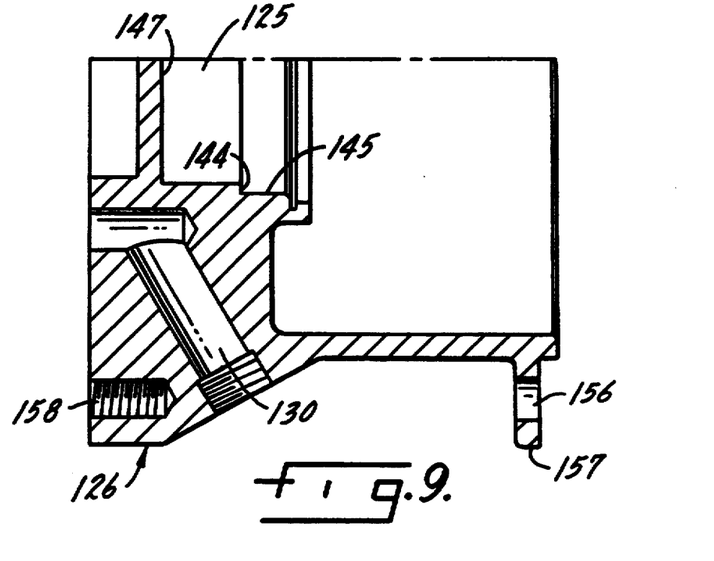
FIG. 9 is a sectional view taken along line 9—9 of FIG. 8.

FIG. 9 is a partial sectional view of the spindle hub 126 particularly illustrating how the spindle hub 126 is attached to the hub 121 (see FIG. 6) with a plurality of studs and nuts (not shown) and holes, one of which is shown at 156.

Figure 10:
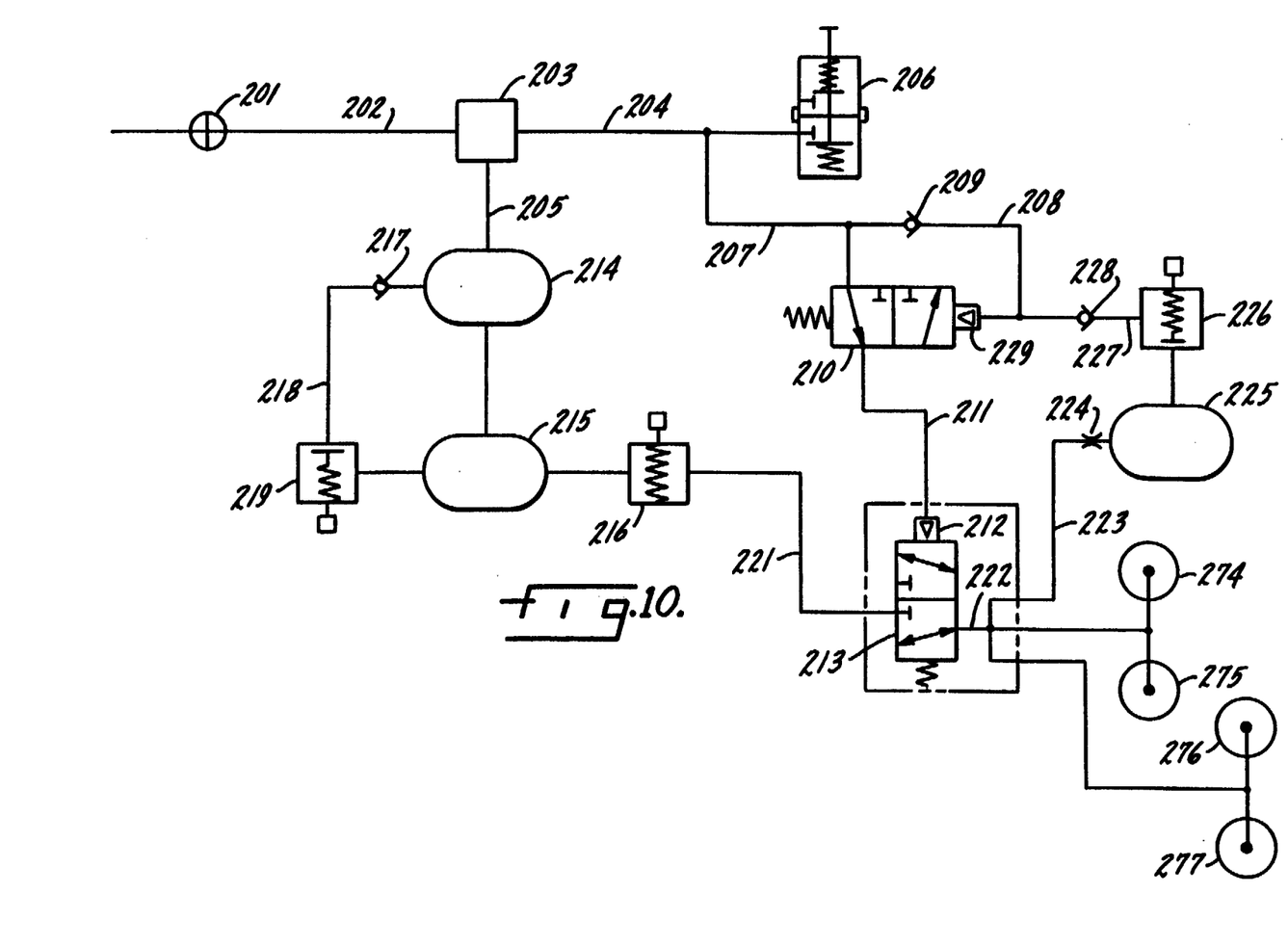
FIG. 10 is a schematic diagram of the airflow and pressure control of the central tire inflation system shown in FIGS. 6 through 9.

Turning to FIG. 10, a single pressure system for use with the embodiments shown in FIGS. 6–9 is presented.

When the emergency brakes to the trailer upon which the CTI system is installed are released, the following cycle is initiated. First, air flows through the glad hand 201 into the conduit 202 and through the optional multifunctional valve 203. Flow is divided at the valve 203 into the conduits 204, 205. Air in the conduit 204 is supplied to the brake can 206. The conduit 204 also feeds the conduit 207 which supplies air through the open and deactivated pneumatic valve 210 to the conduit 211. The closed check valve 209 prevents air from the conduit 207 entering into the conduit 208. The air in the conduit 211 leads to the control port 212 of the pneumatic valve 213 thereby activating the pneumatic valve 213 and establishing communication between the conduits 221, 222.

Returning to the conduit 205, air is supplied to the air reservoir 214. After the air reservoir 214 reaches the desired predetermined pressure, air is allowed to flow past the check valve 217 into the conduit 218 and past the pressure protection valve 219 and into the central tire inflation system reservoir 215 (CTI reservoir 215). The pressure protection valve 219 precludes flow from the reservoir 214 to the CTI reservoir 215 before sufficient pressure is established in the reservoir 214. Therefore, the driver may operate the vehicle prior to the complete pressurization of the CTI reservoir 215.

If the pressure in the CTI reservoir 215 is sufficiently greater than the desired tire pressure, the regulator 216 will reduce the pressure in the conduit 221 before it passes through the now-open pneumatic valve 213 into the conduit 222. Air flows from the conduit 222 to the wheel valves 274, 275, 276, 277. In addition, air is supplied from the conduit 222 into the conduit 223, past the orifice 224 and into the accumulator reservoir 225. When the pressure in the accumulator reservoir 225 exceeds a predetermined desired level, the pressure regulator 226 is opened thereby enabling air pressure to flow from the reservoir 225 into the conduit 227, past the check valve 228 to the control port 229 of the pneumatic valve 210. The now-activated pneumatic valve 210 is switched to the exhaust position thereby venting excess pressure to the atmosphere.

The check valves 209, 228 permit excess air pressure to be exhausted through the pneumatic valve 210 without draining pressure from the conduit 207 and the brake can 206. The check valve 217 precludes air pressure from being communicated from the CTI reservoir 215 to the reservoir 214 which avoids the draining or lowering of tire pressures in the event a leak occurs in the brake system.

As seen from FIGS. 1 and 6, installation of the central tire inflation system of the present invention requires no modification to the axle tubes 11, 111 or the hubs 21, 121. The air reservoir 12 may be the pre-existing air tanks provided on the tractor or a separate air reservoir 12 may be mounted on the trailer. Of course, reservoir 215, 225 would need to be added. As seen in FIG. 5, the central tire inflation system 60 is efficiently designed so that the control equipment may be mounted on either the tractor or the trailer.

Thus, a central tire inflation system is provided that is specifically designed for trailers as either original or retrofit equipment. Although only one preferred embodiment of the present invention has been illustrated and described, it will at once be apparent to those skilled in the art that variations may be made within the spirit and scope of the invention. Accordingly, it is intended that the scope of the invention be limited solely by the scope of the hereafter appended claims and not by any specific wording in the foregoing description.

We claim:

1. A central tire inflation system comprising:
   an axle including means for providing communication between an air reservoir and conduit,
   a seal carrier attached to an end of the axle and enclosing the end of the axle, the seal carrier accommodating the conduit, the conduit providing communication between the axle and a chamber,
   the chamber being bound by an outer housing which surrounds the seal carrier and a single rotary seal means disposed between and engaging both the seal carrier and the outer housing,
   the outer housing including at least one air passageway providing communication between the chamber and means for providing communication between the outer housing and a tire.

2. The central tire inflation system of claim 1, wherein the axle is further characterized as a non-driving axle, the axle supporting the seal carrier and outer housing as well as providing communication between the reservoir and the conduit.

3. The central tire inflation system of claim 2, wherein the axle is further characterized as an axle tube, the axle tube is of a standard size and no modification to the axle tube is required in order to accommodate the seal carrier.

4. The central tire inflation system of claim 3, wherein the seal carrier is connected to a spindle nut, the spindle nut is connected to the end of the axle tube.

5. The central tire inflation system of claim 4, wherein the outer housing is further characterized as including a spindle hub and two air passageways disposed in the spindle hub, a first air passageway establishes communication between the chamber and a wheel valve, the second air passageway establishes communication between the wheel valve and at least one tire.

6. The central tire inflation system of claim 5, wherein the seal means is further characterized as being a rotary seal extending between an inner surface of the spindle hub and outer surface of the seal carrier.

7. The central tire inflation system of claim 3, wherein the seal carrier is further characterized as a spindle sleeve, the spindle sleeve being connected to the end of the axle tube.

8. The central tire inflation system of claim 7, wherein the outer housing is further characterized as including a hub cover and spindle hub, the hub cover being connected to the spindle hub, the seal means being disposed between the spindle sleeve and the spindle hub, the chamber being bound by the hub cover, the spindle sleeve, the spindle hub and the seal means.

9. The central tire inflation system of claim 8, wherein the seal means is further characterized as being a rotary seal extending between an inner surface of the spindle hub and an outer surface of the spindle sleeve.

10. A central tire inflation system comprising:
    an axle, the axle being in communication with an air reservoir,
    first communication means providing sealed communication between the axle and a chamber, the first communication means being disposed generally at an end of the axle and the first communication means further being disposed within a seal carrier, the seal carrier being attached to an end of the axle,
    second communication means providing sealed communication between the chamber and a wheel valve means, the second communication means being disposed generally in an outer housing that is supported by the axle, the outer housing enclosing the end of the axle and the seal carrier,
    the chamber being bound by the seal carrier, the outer housing and a single rotary seal means disposed between and engaging both the outer housing and the seal carrier,
    the second communication means further providing at least one sealed air passageway that terminates at the wheel valve means.

11. The central tire inflation system of claim 10, wherein the axle is further characterized as a non-driving axle, the axle supporting the seal carrier and outer housing as well as providing communication between the reservoir and the first communication means.

12. The central tire inflation system of claim 11, wherein the axle is further characterized as an axle tube, the axle tube is of a standard size and no modification to the axle tube is required in order to accommodate the seal carrier.

13. The central tire inflation system of claim 12, wherein the outer housing is further characterized as including a spindle hub and two air passageways disposed in the spindle hub, a first air passageway establishes communication between the chamber and a wheel valve, the second air passageway establishes communication between the wheel valve and at least one tire.

14. The central tire inflation system of claim 13, wherein the seal means is further characterized as being a rotary seal extending between an inner surface of the spindle hub and outer surface of the seal carrier.

15. The central tire inflation system of claim 12, wherein the seal carrier is further characterized as a spindle sleeve.

16. The central tire inflation system of claim 15, wherein the outer housing is further characterized as including a hub cover and spindle hub, the hub cover being connected to the spindle hub.

17. The central tire inflation system of claim 16, wherein the chamber is bound by the hub cover, the spindle hub, the spindle sleeve and a seal means, the seal means being disposed between the spindle sleeve and the spindle hub.

18. The central tire inflation system of claim 17, wherein the seal means is further characterized as being a rotary seal extending between an inner surface of the spindle hub and an outer surface of the spindle sleeve.

* * * * *